US010593184B2

(12) United States Patent
Greene et al.

(10) Patent No.: US 10,593,184 B2
(45) Date of Patent: Mar. 17, 2020

(54) BABY MONITORING WITH INTELLIGENT AUDIO CUEING BASED ON AN ANALYZED VIDEO STREAM (71) Applicant: Google LLC, Mountain View, CA (US)

(72) Inventors: William Greene, San Bruno, CA (US); Michael Dixon, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/912,018

(22) Filed: Mar. 5, 2018

(65) Prior Publication Data
US 2019/0272724 A1   Sep. 5, 2019

(51) Int. Cl.
G08B 21/02    (2006.01)
G06K 9/00     (2006.01)
H04N 7/18     (2006.01)
G08B 21/18    (2006.01)
G08B 25/08    (2006.01)

(52) U.S. Cl.
CPC ..... *G08B 21/0205* (2013.01); *G06K 9/00342* (2013.01); *G06K 9/00718* (2013.01); *G08B 21/0208* (2013.01); *G08B 21/182* (2013.01); *G08B 25/08* (2013.01); *H04N 7/183* (2013.01)

(58) Field of Classification Search
CPC .......... G08B 21/0205; G06K 9/00342; G06K 9/00718; H04N 7/183
USPC .......................................................... 348/77
See application file for complete search history.

(56) References Cited

U.S. PATENT DOCUMENTS

| 2005/0280704 | A1  | 12/2005 | Clare et al. |
| 2013/0182107 | A1* | 7/2013  | Anderson ............... G08B 21/02 348/143 |
| 2015/0288877 | A1* | 10/2015 | Glazer ................. H04N 5/2251 348/77 |
| 2016/0058429 | A1* | 3/2016  | Shinar ................ A61B 10/0012 600/551 |
| 2016/0345832 | A1  | 12/2016 | Pavagada Nagaraja et al. |
| 2018/0000408 | A1* | 1/2018  | Heinrich ............... A61B 5/0452 |
| 2019/0041973 | A1* | 2/2019  | Maheshwari ........... G06F 3/011 |
| 2019/0138795 | A1* | 5/2019  | Vaidya ............... G06K 9/00288 |

FOREIGN PATENT DOCUMENTS

EP        2976998 A1     1/2016

OTHER PUBLICATIONS

International Search Report and Written Opinion dated Jun. 7, 2019 in International Patent Application No. PCT/US2019/020531, all pages.

* cited by examiner

*Primary Examiner* — Ayman A Abaza
(74) *Attorney, Agent, or Firm* — Kilpatrick Townsend & Stockton LLP (57) ABSTRACT Various arrangements are presented for issuing an alert based on a baby's behavior. A video stream that images a baby may be received. The video stream may be analyzed to determine the baby is in a non-auditory discomfort state. A notification may be determined to be output to a caregiver based on the determined non-auditory discomfort state. An alert may be output that is indicative of the non-auditory discomfort state to an end-user device.

17 Claims, 6 Drawing Sheets

BABY MONITORING WITH INTELLIGENT AUDIO CUEING BASED ON AN ANALYZED VIDEO STREAM

BACKGROUND

Parents typically monitor their young children at night to ensure they are sleeping or at least are comfortable. For babies, typically this involves using a baby monitor. Such a baby monitor can include a camera and microphone incorporated as part of a transmitter unit that is aimed at the baby's sleeping area, such as a crib. The parents may have a receiver unit that allows video and audio captured by the transmitter unit to be viewed and heard. Typically, the captured audio being output by the receiver unit clues the parents into activating a display of the receiver unit to view the video and determine that the baby is in distress. Therefore, if the baby does not make any sound, the parents are unlikely to immediately detect the baby's distress unless they are actively watching the video feed.

SUMMARY

Various embodiments are described related to a method for issuing alerts based on baby behavior. In some embodiments, a method for issuing alerts based on baby behavior is described. The method may include receiving, by a baby monitoring system, a video stream and an audio stream. A baby may be present within frames of the video stream. The method may include analyzing, by the baby monitoring system, the video stream and the audio stream to determine the baby is in a non-auditory discomfort state. The non-auditory discomfort state may be indicative of less than a threshold amount of sound being present within the audio stream. The method may include determining, by the baby monitoring system, to output a notification to a caregiver based on the determined non-auditory discomfort state. The method may include transmitting, by the baby monitoring system, an alert indicative of the non-auditory discomfort state to an end-user device.

Embodiments of such a method may include one or more of the following features: The method may include receiving, by the end-user device, the alert indicative of the non-auditory discomfort state. The method may include analyzing, by the end-user device, the alert indicative of the non-auditory discomfort state to determine that an auditory alert is to be output based on the received alert. The method may include outputting, by the end-user device, the auditory alert via a speaker. The auditory alert output via the speaker may be a recorded or synthesized baby cry. The method may include determining, by the baby monitoring system, a discomfort level based on analyzing the video stream. The method may include determining a volume setting based on the determined discomfort level. The auditory alert may be output by the end-user device via the speaker based at least in part on the determined volume setting. Analyzing the video stream and the audio stream to determine the baby is in the non-auditory discomfort state may include performing an object recognition process to detect the baby within the frames of the video stream. The method may include performing motion detection of the detected baby within the frames of the video stream to determine an amount of motion of the baby. The method may include determining that the baby is in the non-auditory discomfort state at least partially based on the amount of motion of the baby. Analyzing the video stream and the audio stream to determine the baby is in the non-auditory discomfort state may further include determining that the eyes of the baby are open. Determining that the baby is in the non-auditory discomfort state may be at least partially based on determining that the eyes of the baby are open. The method may include capturing, using a streaming video camera, the video stream and the audio stream. The method may include transmitting, by the streaming video camera, to a cloud-based video analysis platform, the video stream and the audio stream. The baby monitoring system may be incorporated as part of the cloud-based video analysis platform. The method may include capturing, using a streaming video camera, the video stream and the audio stream. The baby monitoring system may be incorporated as part of the streaming video camera. The non-auditory discomfort state may represent a pre-wakeup state indicative of the baby being expected to wake up imminently. The method may include deactivating a streaming audio channel to the end-user device based on less than the threshold amount of sound being present within the audio stream and the baby being in a comfort state.

In some embodiments, a system for issuing an alert based on a baby's behavior may include a cloud-based host system. The cloud-based host system may include a storage arrangement that receives and stores video and audio streams from a plurality of streaming video cameras. The cloud-based host system may include a baby monitoring system. The baby monitoring system may include one or more processors. The baby monitoring system may include a memory communicatively coupled with and readable by the one or more processors and having stored therein processor-readable instructions which, when executed by the one or more processors, may cause the one or more processors to receive a video stream and an audio stream. A baby may be present within frames of the video stream. The one or more processors may analyze the video stream and the audio stream to determine the baby is in a non-auditory discomfort state. The non-auditory discomfort state may be indicative of less than a threshold amount of sound being present within the audio stream. The one or more processors may determine to output a notification to a caregiver based on the determined non-auditory discomfort state. The one or more processors may transmit an alert indicative on the non-auditory discomfort state to an end-user device.

Embodiments of such a system may include one or more of the following features: The system may include an application executed by an end-user device. The application may be configured to receive the alert indicative of the non-auditory discomfort state. The application may analyze the alert indicative of the non-auditory discomfort state to determine that an auditory alert is to be output based on the received alert. The application may output the auditory alert via a speaker. The auditory alert output via the speaker may be a recorded or synthesized baby cry. The cloud-based host system may be further configured such that the processor-readable instructions, when executed, may further cause the one or more processors to determine a discomfort level based on analyzing the video stream. The one or more processors may determine a volume setting based on the determined discomfort level. The auditory alert may be output by the end-user device via the speaker based at least in part on the determined volume setting. The processor-readable instructions that, when executed, may cause the one or more processors to analyze the video and audio stream to determine the baby is in the non-auditory discomfort state may include processor-readable instructions which, when executed, cause the one or more processors to perform an object recognition process to detect the baby within the frames of the video stream. The one or more processors may perform motion detection of the detected baby within the frames of the video stream to determine an amount of motion of the baby. The one or more processors may determine that the baby is in the non-auditory discomfort state at least partially based on the amount of motion of the baby. The processor-readable instructions that, when executed, may cause the one or more processors to analyze the video and audio stream to determine the baby is in the non-auditory discomfort state may include processor-readable instructions which, when executed, cause the one or more processors to determine that the eyes of the baby are open. Determining that the baby is in the non-auditory discomfort state may be at least partially based on determining that the eyes of the baby are open. The system may further include a streaming video camera of the plurality of the streaming video cameras. The streaming video camera may be configured to capture the video stream and the audio stream. The streaming video camera may be configured to transmit to the cloud-based host system, the video stream and the audio stream. The non-auditory discomfort state may represent a pre-wakeup state indicative of the baby being expected to wake up imminently. The cloud-based host system may be further configured such that the processor-readable instructions, when executed, may further cause the one or more processors to deactivate a streaming audio channel to the end-user device based on less than the threshold amount of sound being present within the audio stream and the baby being in a comfort state.

In some embodiments, a system for issuing an alert based on a baby's behavior is described. The system may include a cloud-based host system. The cloud-based host system may include a storage arrangement that receives and stores video and audio streams from a plurality of streaming video cameras. The system may include a streaming video camera comprising an integrated baby monitoring system. The system may include one or more processors. The system may include a memory communicatively coupled with and readable by the one or more processors and having stored therein processor-readable instructions which, when executed by the one or more processors, may cause the one or more processors to receive a video stream and an audio stream. A baby may be present within frames of the video stream. The one or more processors may analyze the video stream and the audio stream to determine the baby is in a non-auditory discomfort state. The non-auditory discomfort state may be indicative of less than a threshold amount of sound being present within the audio stream. The one or more processors may determine to output a notification to a caregiver based on the determined non-auditory discomfort state. The one or more processors may transmit an alert indicative of the non-auditory discomfort state to an end-user device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

While a baby's cry may alert his parents to the baby being in distress, sometimes a baby will not audibly indicate his distress. For example, if the baby is tossing in his sleep, is awake and moving around when the baby is expected to be asleep, or worse, is choking, tangled in bedding, or otherwise is in a dangerous position, the baby is in distress but may not be crying. Therefore, in some circumstances, a parent may wish to be alerted to the occurrence of such a worrisome situation.

Despite the baby not creating a significant cry or other form of audible sound, an audible alert may be an effective way to notify the parent that the baby is experiencing discomfort. For instance, when at home, parents may tend to not constantly carry a baby monitor or computerized device, such as a smartphone. Therefore, a visual alert presented by a baby monitor or computerized device may go unnoticed for some time. An audible alert, however, may be likely to be heard by a parent despite the parent potentially being a distance from the device that output the audible alert.

The audible alert may be made to mimic the baby and indicate the level of distress of the baby. The audible alert may be a recording of a cry of the baby, a recording of another baby's cry, or a synthesized cry. In some embodiments, a different form of audible alert may be used, such as a chime or beep. The volume of the audible alert may be controlled to be indicative of the determined level of distress of the baby. The use of an audible alert that mimics a baby's natural response (e.g., a cry) may help trigger physiological responses of the parents, especially mothers. Such a physiological response can trigger more immediate action by the parent than other forms of alerts.

In a conventional baby monitor arrangement, audio may be transmitted as a stream continuously to a baby monitor receiver. This arrangement can result in a parent listening to many sounds that are unimportant, such as a baby's sneeze, cough, or turning in his sleep. Arrangements detailed herein can also be used to deactivate and reactivate transmission and/or output of an audio stream. Reactivation of transmission and/or output of the audio stream may occur when a sound is long enough in duration and/or loud enough to cross a predefined threshold.

This document repeatedly refers to a "baby." It should be understood that this term can generally apply to a child under the age of four years old. However, it should be understood that the embodiments detailed herein may be useful for monitoring other persons who can be older than four. For example, embodiments detailed herein may be useful for monitoring an elderly person who has difficulty communicating. Further, this application repeatedly refers to "parents." While an adoptive or biological parent is typically a baby's caretaker, it should be understood that the embodiments detailed herein can apply to persons other than a parent, such as any form of caretaker, babysitter, nanny, relative, nurse, medical professional, or, generally, any person that monitors a baby or other type of person that could benefit from monitoring.

Figure 1:
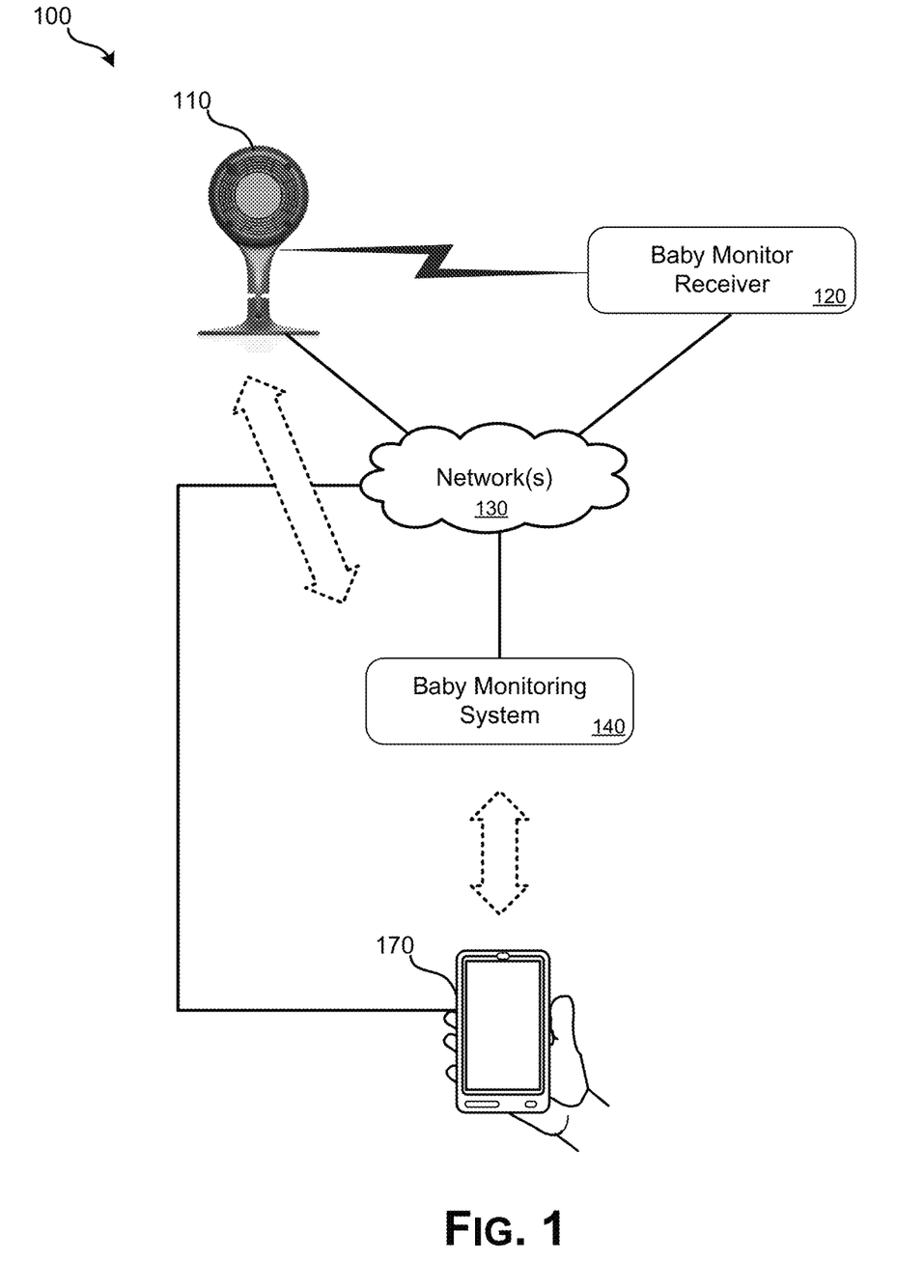
FIG. 1 illustrates an embodiment of a baby monitoring system.

FIG. 1 illustrates a block diagram of an embodiment of a system 100 for monitoring a baby to determine if the baby is in a discomfort state and alert a caretaker. System 100 can include: streaming video camera 110, baby monitor receiver 120, one or more networks ("network(s)") 130, baby monitoring system 140, and end-user device 170. Streaming video camera 110 may capture a stream of video frames using a camera and an audio stream using one or more microphones. In some embodiments, a separate device may be used to capture the audio stream. These video frames and the audio stream may be transmitted via one or more networks to baby monitoring system 140. Network(s) 130 may include a local wireless area network and the Internet. In some embodiments, streaming video camera communicates using wired communication to a gateway device that, in turn, communicates with the Internet. Streaming video camera 110 may include a wired or wireless communication interface; a camera; a microphone, one or more processors; and/or one or more integrated lights. Streaming video camera 110 may serve multiple functions. Streaming video camera 110 may be used as a baby monitor transmitter and may also be used as a video camera device, such as part of a security system. Video and, possibly, audio captured by streaming video camera 110 may be stored by a cloud-based server system. Such video and/or audio may also be streamed live to one or more end-user devices, such as end-user device 170. In some embodiments, such as when streaming video camera 110 is being used to monitor a baby, video and/or audio may be transmitted (possibly directly or via network(s) 130) to baby monitor receiver 120.

Baby monitor receiver 120 may receive video and/or audio from streaming video camera 110. Such video and/or audio may be transmitted directly from streaming video camera 110 to baby monitor receiver 120, via network(s) 130, or relayed via network(s) 130 by baby monitoring system 140. Baby monitor receiver 120 may include a speaker and electronic display. Such an arrangement allows video and audio captured by streaming video camera 110 to be output in real time (e.g., within a second of the video and audio being captured) for viewing and/or listening by a parent. In some embodiments, audio is amplified and continuously output. To save power, the electronic display of baby monitor receiver 120 may be enabled and disabled by a parent (or other party performing the monitoring, as previously noted). Baby monitoring system 140 may be integrated as part of baby monitor receiver 120.

Baby monitoring system 140 may communicate with streaming video camera 110, baby monitor receiver 120, and/or end-user device 170 via one or more networks 130, which can include the Internet. Baby monitor system 140 may include one or more computer systems. Further detail regarding baby monitor system 140 is provided in relation to FIG. 2. In some embodiments, rather than baby monitor system 140 being incorporated as part of one or more cloud-accessible computing systems, baby monitor system 140 may be incorporated as part of streaming video camera 110, baby monitor receiver 120, and/or end-user device 170. As such, one or more processors incorporated as part of streaming video camera 110, baby monitor receiver 120, and/or end-user device 170 can perform some or all of the tasks discussed in relation to baby monitor system 140 detailed in relation to FIG. 2.

End-user device 170 may be used to function as a baby monitor receiver. End-user device 170 may include a speaker and display that allows video and audio captured by streaming video camera 110 to be output for presentation. End-user device 170 may be various forms of a computerized device, such as a smartphone, gaming device, tablet computer, or laptop computer. A native application may be installed on and executed by end-user device 170 to allow for output of the video and audio captured by streaming video camera 110. In some embodiments, video and audio captured by streaming video camera 110 may be transmitted to baby monitoring system 140 for storage and processing. Video and/or audio may then be transmitted by baby monitoring system 140 to end-user device 170 for output via the application or via a website accessible using end-user device 170.

Streaming video camera 110, end-user device 170 and/or baby monitor receiver 120 may function as part of a smart home environment. A smart device functioning within the smart home environment may be used to gather data about occupants and/or output audible notifications, such as based on an alert output by baby monitoring system 140. Therefore, for example, if a home assistant device is installed within the home, the home assistant device may be used for outputting an audible notification based on video captured by streaming video camera 110. Further detail regarding such a smart home environment is detailed in relation to FIG. 4.

Figure 2:
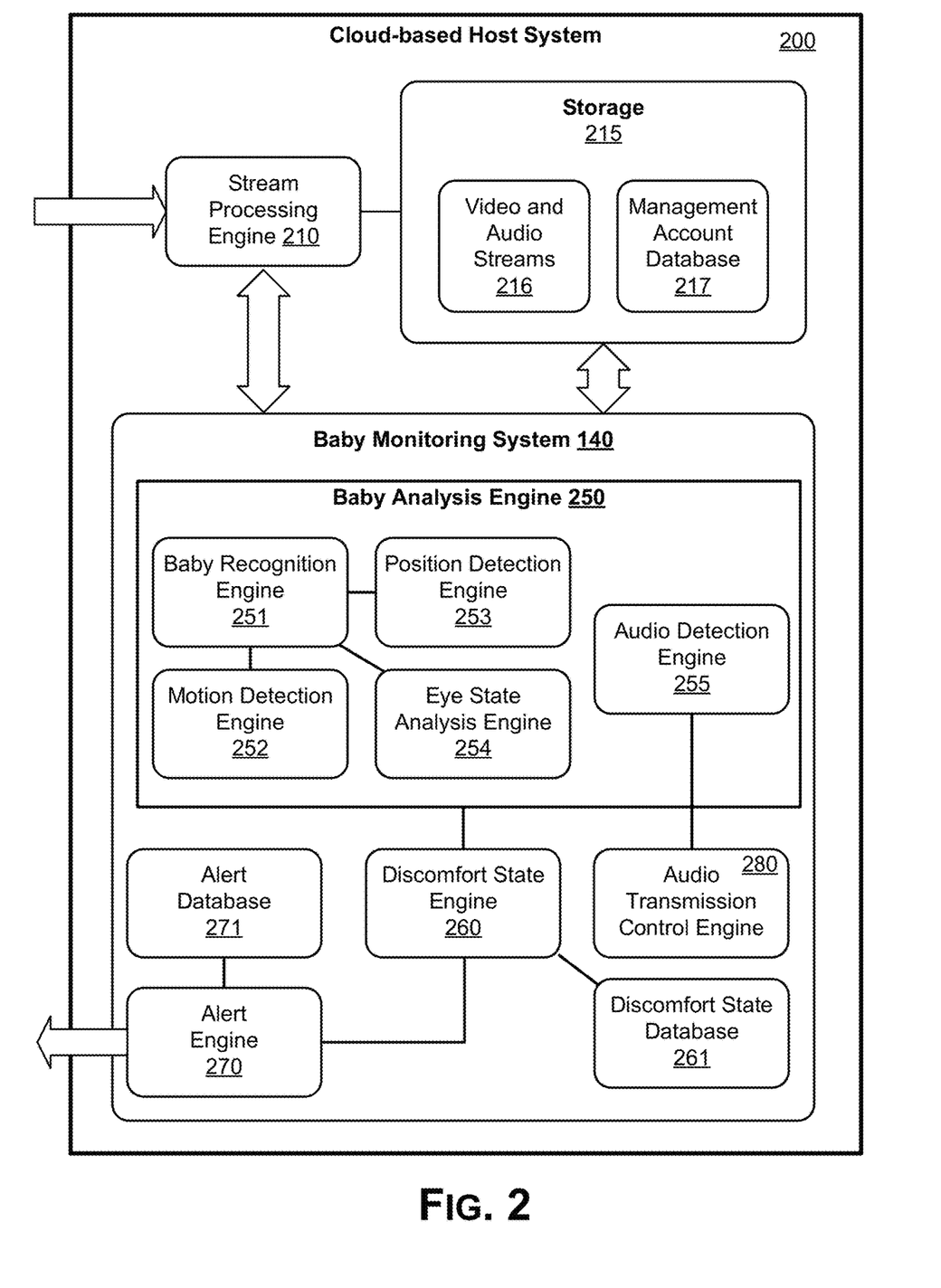
FIG. 2 illustrates an embodiment of a baby monitoring system incorporated as part of a cloud-based host system.

FIG. 2 illustrates an embodiment of a baby monitoring system incorporated as part of a cloud-based host system 200. Baby Monitoring system 140 may be performed by cloud-based host system 200 in addition to other functions. A function of cloud-based host system 200 may be to receive and store video and/or audio streams, such as from streaming video camera 110. Stream processing engine 210 may receive video and audio streams from many streaming video cameras, including streaming video camera 110. Received video and audio streams may be stored to storage 215 for at least a period of time. Storage 215 can represent one or more non-transitory processor-readable mediums, such as hard drives, solid-state drives, or memory. Stream processing engine 210 may route video and audio to baby monitoring system 140 if a management account linked to the received video has baby monitoring enabled.

Video and audio streams 216 can represent various video and audio streams that are stored for at least a period of time by storage 215. Cloud-based host system 200 may store such video streams for a defined window of time, such as one week or one month. Management account database 217 may store account information for many user accounts. Account information for a given management account can include a username, password, indications of various devices linked with the management account (e.g., streaming video camera 110 and end-user device 170). By logging in to a particular management account, an end-user may be able to access stored video and audio streams of video and audio streams 216 linked with that management account. The end-user may also be able to stream video and/or audio live (i.e., in real-time or near real-time).

Stream processing engine 210 may perform various processing functions on received video and audio streams. If a particular video stream and/or audio stream is to be analyzed to determine if a baby is in discomfort, stream processing engine 210 may route a subset or all video frames and audio data to baby monitoring system 140. In some embodiments, to decrease the amount of processing performed while still maintaining a high degree of accuracy, only some frames received by stream processing engine 210 may be analyzed by baby monitoring system 140. For example, only one or two frames per second may be routed to baby monitoring system 140. It should be understood that a video stream and audio stream may coexist as a single stream of video data and audio data or may be distinct streams.

Baby monitoring system 140 may include baby analysis engine 250, discomfort state engine 260, discomfort state database 261, alert engine 270, alert database 271, and audio transmission control engine 280. The functions of baby monitoring system 140 may be performed using one or more computing systems, such as servers, which may be distributed. Such servers may be dedicated to performing the tasks of baby monitoring system 140 or may perform other additional functions.

Baby analysis engine 250 may analyze received audio and video to determine if a parent should be alerted that a baby being monitored is in discomfort, such as non-auditory discomfort. "Non-auditory discomfort" is defined as a state of unrest in which the baby is not generating loud and/or sustained sound (e.g., crying). Therefore, a non-auditory discomfort alert is intended to alert a parent or other party that the baby is in a state of unrest in which the baby is not generating loud and/or sustained sound. Audio detection engine 255 may monitor an audio stream received from stream processing engine 210 to determine whether the baby is making continuous sound above a defined sound threshold level. Audio detection engine 255 may store a predefined threshold level for sound. If a sound is registered above this threshold, the baby may not be considered in non-auditory discomfort. Rather, such a situation may be more congruous with conventional discomfort, such as in which the baby is crying. In addition to the volume of the sound, a duration of the sound may be analyzed by audio detection engine 255. A duration of the sound (or average decibel level of the sound over a time period) may be analyzed in concert with the sound's maximum volume. For example, in order for the audio to be output to a device for listening by a parent, the sound may need to exceed the threshold level and may need to average above a second defined threshold over a predefined duration of time. Such an arrangement may prevent brief sounds, such as the baby sneezing or coughing, from triggering audio to be output to a device for viewing and/or listening by a parent.

A condition for a baby being determined to be in non-auditory discomfort may be that sounds detected in the environment of the baby (e.g., sounds generated by the baby, sounds generated by objects near the baby) are of low enough volume that the volume or measured decibel level remains below a predefined threshold level Any sounds that exceed the predefined threshold level may be required to be of a short enough duration that a predefined duration of time is not exceeded while the sound is louder than the defined threshold. For instance, a baby's sneeze or cough may be loud enough to exceed the volume threshold, but may not exceed the predefined threshold time duration. In contrast, a sustained cry of the baby may exceed both the volume threshold and the predefined time threshold. In other embodiments, a variable combination of duration and volume may be used to determine whether the baby is in non-auditory discomfort. The greater a volume of sound generated in the environment of the baby (e.g., by the baby itself), the shorter the duration of the sound may be necessary in order to determine that there is a discomfort situation present. For example, a "low battery" chirp by a smoke detector or carbon monoxide detector may be very short in duration but loud enough that video and/or audio received in the video and audio streams are immediately output to an end-user or some other form of alert is output to notify a parent of the situation.

Baby recognition engine 251 may perform an object recognition process to determine whether and where a baby is present within the field of view of the streaming video camera. Baby recognition engine 251 may be trained to recognize a baby. For example, a neural network process may be exposed to a large number of training images and/or video that do and do not include a baby. This training set may be used to allow the neural network process to "learn" how to identify a baby within a frame and/or a video stream. The portion of the video determined to correspond to a baby by baby recognition engine 251 may be passed to motion detection engine 252.

Motion detection engine 252 may determine an amount of movement of the baby. The greater amount of movement exhibited by the baby, the greater distress the baby may be assumed to be in. The amount of movement may be measured over time. For instance, an amount of movement may be classified or scored over a rolling window of time. As an example of how motion can reflect discomfort, while the baby may be asleep, if the baby is continually tossing and turning, the baby may be in some form of discomfort, such as being too hot or too cold. An amount of motion may be determined based on the magnitude of movement within a defined window of time.

Position detection engine 253 may determine a position of the baby. Position detection engine 253 may determine whether the baby is standing, kneeling, laying down, crawling, walking, climbing, or in some other stationary or moving position. Position detection engine 253 may also be able to determine if the baby is exiting the field of view of the camera. For instance, if the streaming video camera is aimed at a crib, the baby leaving the field of view may be particularly worrisome because this may indicate that the baby is climbing out of the crib.

Eye state analysis engine 254 may analyze a state of the baby's eyes if the baby's face is generally pointing towards the streaming video camera. If the baby's eyes are open, this eye state may be indicative of the baby being awake. If the baby's eyes are shut, this eye state may be indicative of the baby being asleep. Eye state analysis engine 254 may be trained to recognize open and shut eyes, such as by detecting eye pupils, whites of the eye, and/or irises.

Discomfort state engine 260 may use data from motion detection engine 252, position detection engine 253, eye state analysis engine 254, and audio detection engine 255 to determine if a non-auditory discomfort alert should be transmitted to a parent or other form of user. In order for a non-auditory discomfort alert to be eligible for transmission, audio detected by audio detection engine 255 may be required to qualify as being low enough based on a measured volume and/or duration of the sound. If the audio detected by audio detection engine 255 does not qualify, the parent or user may still be notified, however a form of alert other than a non-auditory discomfort alert may be transmitted. Discomfort state engine 260 may analyze the amount of motion detected by motion detection engine 252, the current position of the baby as determined by position detection engine 253, and a state of the baby's eyes as detected by eye state analysis engine 254. Discomfort state engine 260 may access discomfort state database 261 to determine whether a particular combination of motion, position, and/or eye state should result in a non-auditory discomfort alert being transmitted to a parent or other form of user via an end-user device, baby monitor receiver, or home automation device that has been linked with a same management account as the streaming video camera.

Discomfort state database 261 may, for example, be a table of possible combinations that are to result in discomfort state engine 260 triggering alert engine 270 to transmit a non-auditory discomfort alert. Table 1 lists a variety of examples in which an alert is to be transmitted. Further, discomfort state database 261 may indicate a severity or level of the discomfort state. This severity or level may affect how the alert is output, such as the volume of the alert output.

TABLE 1

| Amount of Motion | Position | Eye State | Non-auditory discomfort alert to be sent? | Severity/Level |
|---|---|---|---|---|
| High | Standing | Open | Yes | High |
| Low | Sitting | Open | Yes | Low |
| Medium | Laying | Closed | Yes | Low |
| Medium | Laying | Closed | No | N/A |
| Low | Standing | Open | Yes | Medium |

Discomfort state engine 260, after determining whether a non-auditory discomfort alert should be sent and assigning a severity or level discomfort alert, may transmit data to alert engine 270. Alert engine 270 may transmit the alert to an end-user device or baby monitor receiver for output. Alert engine 270 may access management account database 217 to determine a user account linked with the analyzed video and audio feeds. Therefore, only parents or other authorized users who are linked with the same management account with which the video and audio streams are linked receive an alert. Alert database 271 may be accessed by alert engine 270 to select a type of alert to be output based on the level. Alert database 271 may store different volume levels at which alert can be output based on the severity level of the non-auditory discomfort alert. In some embodiments, alert database 271 may store prerecorded cries of the baby for which the alerts are being output. In other embodiments, stored generic recordings or a synthesized cry may be output as an auditory indication of the non-auditory discomfort alert. The type of cry or volume of the cry may be varied based on severity or level of the non-auditory discomfort alert. In some embodiments, alert database 271 may store other sounds, such as dings, chimes, or chirps that are used to alert a parent or user. In some embodiments, alert database 271 is stored by the device that is going to output the alert rather than baby monitoring system 140. For example, alert database 271 may be stored by an end-user device, such as part of an application installed on the end-user device.

Audio transmission control engine 280 may be used to control when an audio stream is transmitted to a baby monitor receiver, end-user device, and/or smart home device. Audio transmission control engine 280 may alternatively control when the baby monitor receiver, end-user device, and/or smart home device output an audio stream. Conventionally, a baby monitor receiver may continuously output audio from an audio capture device (such as the streaming video camera) monitoring the baby. In contrast, arrangements detailed herein can cease transmitting or outputting audio to save power and/or decrease the disturbance of the parent performing the monitoring by filtering out inconsequential sounds. Audio transmission control engine 280 may cease an audio stream from being transmitted to a baby monitor receiver, end-user device, and/or smart home device based on: 1) the volume of the audio remaining below a threshold volume level for at least a predefined period of time; 2) discomfort state engine 260 determining that the baby is not in a state of discomfort; and 3) if sound detected in the vicinity of the baby exceeds the threshold volume level, but does not exceed the threshold volume level for more than a predefined excursion time period. Factor three may help audio transmission control engine 280 filter out minor noises, such as a burp, hiccup, cough, or sneeze of the baby, from being output by an end-user device and disturbing a parent. If any of the factors are violated, audio transmission control engine 280 may cause the audio stream to be transmitted to and/or output by a baby monitor receiver, end-user device, and/or smart home device for at least a period of time before transmission or output is again ceased. When a discomfort event is detected by discomfort state engine 260, even though the discomfort event may be non-auditory, an audio transmission control engine 280 may cause the audio stream to be output to the baby monitor receiver, end-user device, and/or smart home device to allow a parent to closely monitor the baby while he is possibly in distress. It should be understood that similar transmission and/or output control may be performed for video.

Figure 3:
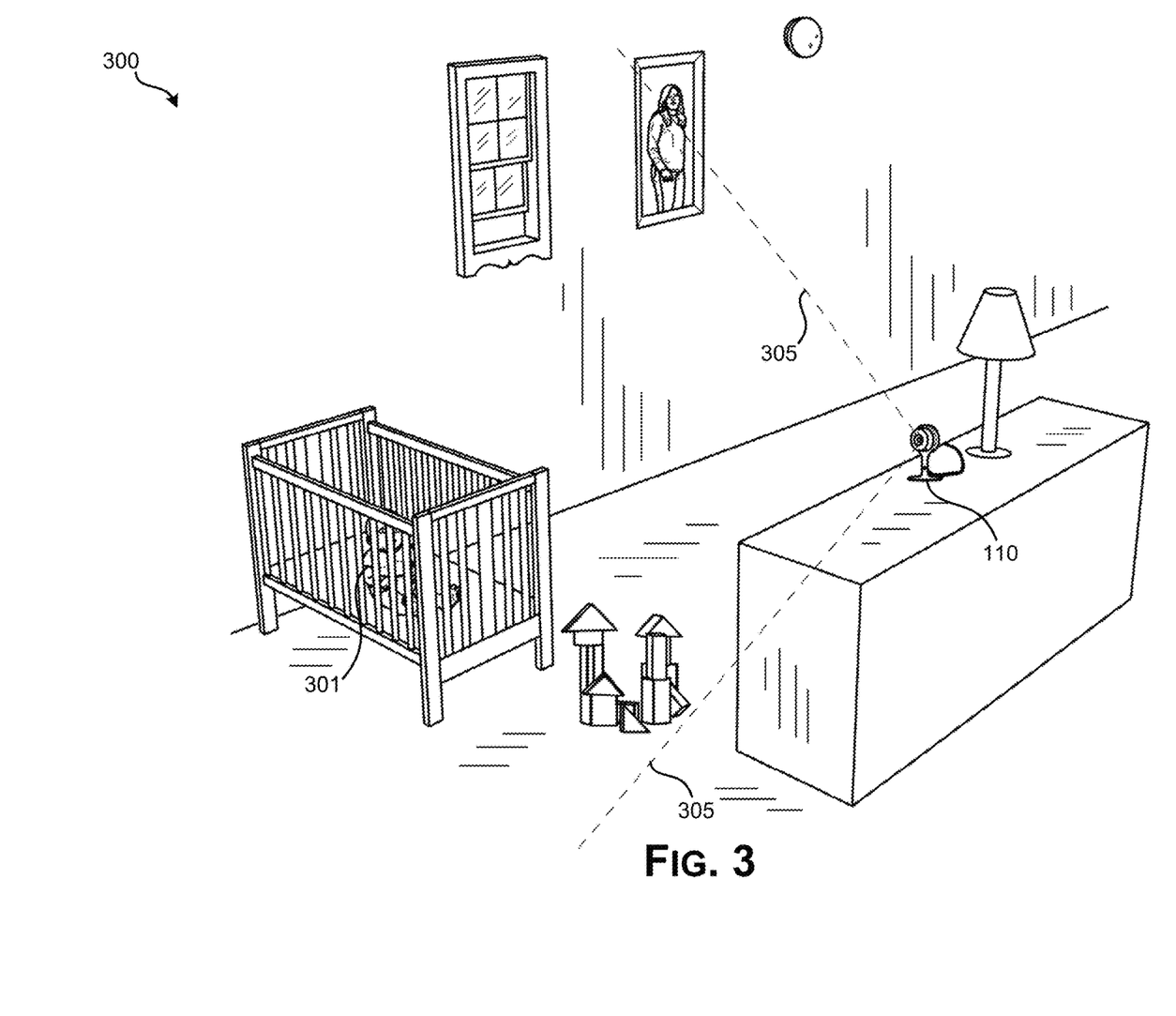
FIG. 3 illustrates an embodiment of a baby in non-auditory discomfort.

FIG. 3 illustrates an embodiment 300 of a baby in non-auditory discomfort. In embodiment 300, baby 301 is sitting up with his eyes open within a crib. Baby 301 is located within the field of view, as indicated by dotted lines 305, of streaming video camera 110. In embodiment 300, baby 301 is not making any loud sounds and the environment in which the baby is located is generally quiet. In this example, a non-auditory discomfort alert may be transmitted to a device of a parent or other form of caretaker based on analysis of baby 301. The analysis of baby 301 may determine that the baby is moving a small amount, is in a sitting position, and has his or her eyes open. By consulting discomfort state database 261, discomfort state engine 260 may determine that a non-auditory discomfort alert is to be transmitted having a low severity. This may involve a recorded or synthesized cry being output by an end-user device, baby monitor receiver, and/or smart home device. The use of an audible alert that mimics a baby's natural response (e.g., a cry) may help trigger physiological responses of the parents, especially mothers. Such a physiological response can trigger more immediate action by the parent than other forms of alerts. In other embodiments, a different form of sound may be used to alert a parent or user of the non-auditory discomfort alert. In some embodiments, the non-auditory discomfort alert has a visual component, such as an on-screen notification. In some embodiments, the notification may take the form of a live video feed of baby 301 being activated on the end-user device.

Figure 4:
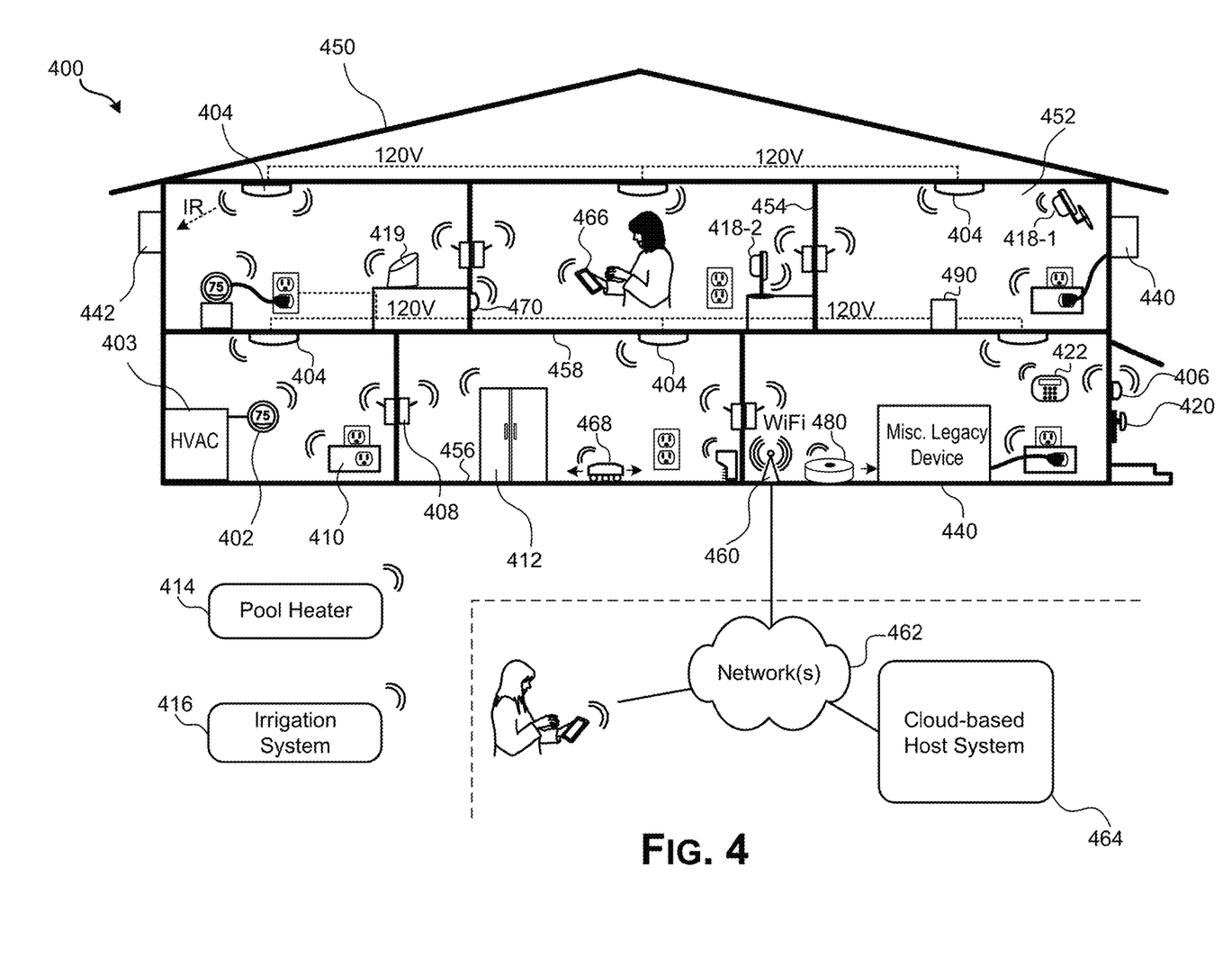
FIG. 4 illustrates an embodiment of a smart-home environment in which a baby monitoring system may operate.

FIG. 4 illustrates an embodiment of a smart home environment 400 in which a baby may be monitored. A streaming video camera may be incorporated as part of a smart home environment. Additionally or alternatively, a streaming video camera may be incorporated as part of some other smart home device, such as those detailed in relation to smart home environment 400.

The smart home environment 400 includes a structure 450 (e.g., a house, daycare, office building, garage, or mobile home) with various integrated devices. It will be appreciated that devices may also be integrated into a smart home environment 400 that does not include an entire structure 450, such as an apartment or condominium. Further, the smart home environment 400 may control and/or be coupled to devices outside of the actual structure 450. Indeed, several devices in the smart home environment 400 need not be physically within the structure 450. For example, a device controlling a pool heater monitor 414 or irrigation system monitor 416 may be located outside of the structure 450.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The non-auditory discomfort alerts detailed herein may be output by a variety of smart home devices. For example, if a baby is being monitored, a parent may be moving throughout the home. Therefore, it may be useful for an indication of the non-auditory discomfort alert to be output by one or more smart devices, such as those detailed in smart home environment 400, throughout the home.

It is also to be appreciated that while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 450 includes a plurality of rooms 452, separated at least partly from each other via walls 454. The walls 454 may include interior walls or exterior walls. Each room may further include a floor 456 and a ceiling 458. Devices may be mounted on, integrated with and/or supported by a wall 454, floor 456 or ceiling 458.

In some implementations, the integrated devices of the smart home environment 400 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 400 may include one or more intelligent, multi-sensing, network-connected thermostats 402 (hereinafter referred to as "smart thermostats 402"), one or more intelligent, network-connected, multi-sensing hazard detection units 404 (hereinafter referred to as "smart hazard detectors 404"), one or more intelligent, multi-sensing, network-connected entryway interface devices 406 and 420 (hereinafter referred to as "smart doorbells 406" and "smart door locks 420"), and one or more intelligent, multi-sensing, network-connected alarm systems 422 (hereinafter referred to as "smart alarm systems 422").

In some implementations, the one or more smart thermostats 402 detect ambient climate characteristics (e.g., temperature and/or humidity) and control an HVAC system 403 accordingly. For example, a respective smart thermostat 402 includes an ambient temperature sensor.

The one or more smart hazard detectors 404 may include thermal radiation sensors directed at respective heat sources (e.g., a stove, oven, other appliances, a fireplace, etc.). For example, a smart hazard detector 404 in a kitchen 453 includes a thermal radiation sensor directed at a stove/oven 412. A thermal radiation sensor may determine the temperature of the respective heat source (or a portion thereof) at which it is directed and may provide corresponding blackbody radiation data as output.

The smart doorbell 406 and/or the smart door lock 420 may detect a person's approach to or departure from a location (e.g., an outer door), control doorbell/door locking functionality (e.g., receive user inputs from a portable electronic device 466-1 to actuate the bolt of the smart door lock 420), announce a person's approach or departure via audio or visual means, and/or control settings on a security system (e.g., to activate or deactivate the security system when occupants go and come). In some implementations, the smart doorbell 406 includes some or all of the components and features of the camera 418-1. In some implementations, the smart doorbell 406 includes a camera 418-1, and, therefore, is also called "doorbell camera 406" in this document. Cameras 418-1 and/or 418-2 may function as a streaming video camera (similar to streaming video camera 110) and the streaming audio device detailed in relation to various embodiments herein. Cameras 418 may be mounted in a location, such as indoors and to a wall or can be moveable and placed on a surface, such as illustrated with camera 418-2. Various embodiments of cameras 418 may be installed indoors or outdoors. For performing baby monitoring, cameras 418 may be placed near a location where the baby is occasionally located, such as a crib, playpen, bassinet, bed, etc.

The smart alarm system 422 may detect the presence of an individual within close proximity (e.g., using built-in IR sensors), sound an alarm (e.g., through a built-in speaker, or by sending commands to one or more external speakers), and send notifications to entities or users within/outside of the smart home environment 400. In some implementations, the smart alarm system 422 also includes one or more input devices or sensors (e.g., keypad, biometric scanner, NFC transceiver, microphone) for verifying the identity of a user, and one or more output devices (e.g., display, speaker). In some implementations, the smart alarm system 422 may also be set to an armed mode, such that detection of a trigger condition or event causes the alarm to be sounded unless a disarming action is performed. In embodiments detailed herein, an alarm system may be linked with a service provider other than a provider of cameras 418. As such, remote services provided by the alarm system may be provided by an entity that does not provide the video and/or audio storage and analysis.

In some implementations, the smart home environment 400 includes one or more intelligent, multi-sensing, network-connected wall switches 408 (hereinafter referred to as "smart wall switches 408"), along with one or more intelligent, multi-sensing, network-connected wall plug interfaces 410 (hereinafter referred to as "smart wall plugs 410"). The smart wall switches 408 may detect ambient lighting conditions, detect room-occupancy states, and control a power and/or dim state of one or more lights. In some instances, smart wall switches 408 may also control a power state or speed of a fan, such as a ceiling fan. The smart wall plugs 410 may detect occupancy of a room or enclosure and control the supply of power to one or more wall plugs (e.g., such that power is not supplied to the plug if nobody is at home).

In some implementations, the smart home environment 400 of FIG. 4 includes a plurality of intelligent, multi-sensing, network-connected appliances 412 (hereinafter referred to as "smart appliances 412"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 440, such as old conventional washer/dryers, refrigerators, and the like, which may be controlled by smart wall plugs 410. The smart home environment 400 may further include a variety of partially communicating legacy appliances 442, such as infrared ("IR") controlled wall air conditioners or other IR-controlled devices, which may be controlled by IR signals provided by the smart hazard detectors 404 or the smart wall switches 408.

In some implementations, the smart home environment 400 includes one or more network-connected cameras 418 that are configured to provide video monitoring and security in the smart home environment 400. The cameras 418 may be used to determine occupancy of the structure 450 and/or particular rooms 452 in the structure 450, and thus may act as occupancy sensors. For example, video captured by the cameras 418 may be processed to identify the presence of an occupant in the structure 450 (e.g., in a particular room 452). Specific individuals may be identified based, for example, on their appearance (e.g., height, face) and/or movement (e.g., their walk/gait). Cameras 418 may additionally include one or more sensors (e.g., IR sensors, motion detectors), input devices (e.g., microphone for capturing audio), and output devices (e.g., speaker for outputting audio). In some implementations, the cameras 418 are each configured to operate in a day mode and in a low-light mode (e.g., a night mode). In some implementations, the cameras 418 each include one or more IR illuminators for providing illumination while the camera is operating in the low-light mode. In some implementations, the cameras 418 include one or more outdoor cameras. In some implementations, the outdoor cameras include additional features and/or components such as weatherproofing and/or solar ray compensation.

The smart home environment 400 may additionally or alternatively include one or more other occupancy sensors (e.g., the smart doorbell 406, smart door locks 420, touch screens, IR sensors, microphones, ambient light sensors, motion detectors, smart nightlights 470, etc.). In some implementations, the smart home environment 400 includes radio-frequency identification (RFID) readers (e.g., in each room 452 or a portion thereof) that determine occupancy based on RFID tags located on or embedded in occupants. For example, RFID readers may be integrated into the smart hazard detectors 404.

The smart home environment 400 may also include communication with devices outside of the physical home but within a proximate geographical range of the home. For example, the smart home environment 400 may include a pool heater monitor 414 that communicates a current pool temperature to other devices within the smart home environment 400 and/or receives commands for controlling the pool temperature. Similarly, the smart home environment 400 may include an irrigation system monitor 416 that communicates information regarding irrigation systems within the smart home environment 400 and/or receives control information for controlling such irrigation systems.

Smart home assistant 419 may have one or more microphones that continuously listen to an ambient environment. Smart home assistant 419 may be able to respond to verbal queries posed by a user, possibly preceded by a triggering phrase. Smart home assistant 419 may stream audio and, possibly, video if a camera is integrated as part of the device, to a cloud-based host system 464 (which represents an embodiment of cloud-based host system 200 of FIG. 2). In some embodiments, a user may pose a query to smart home assistant 419 about a baby monitored by at least one of cameras 418. Smart home assistant 419 may be a smart device through which non-auditory discomfort alerts may be output and/or an audio stream from the streaming video camera can be output. For example, if the volume of audio measured in a vicinity of the baby is loud enough, this audio may be streamed to smart home assistant 419 for output.

By virtue of network connectivity, one or more of the smart home devices of FIG. 4 may further allow a user to interact with the device even if the user is not proximate to the device. For example, a user may communicate with a device using a computer (e.g., a desktop computer, laptop computer, or tablet) or other portable electronic device 466 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 400 using a network-connected computer or portable electronic device 466. In some examples, some or all of the occupants (e.g., individuals who live in the home) may register their portable electronic device 466 with the smart home environment 400. Such registration may be made at a central server to authenticate the occupant and/or the device as being associated with the home and to give permission to the occupant to use the device to control the smart devices in the home. An occupant may use their registered portable electronic device 466 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering portable electronic devices 466, the smart home environment 400 may make inferences about which individuals live in the home and are therefore occupants and which portable electronic devices 466 are associated with those individuals. As such, the smart home environment may "learn" who is an occupant and permit the portable electronic devices 466 associated with those individuals to control the smart devices of the home.

In some implementations, in addition to containing processing and sensing capabilities, devices 402, 404, 406, 408, 410, 412, 414, 416, 418, 420, and/or 422 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 460) to a network, such as the Internet. Through the Internet, the smart devices may communicate with a cloud-based host system 464 (also called a cloud-based server system, central server system, and/or a cloud-computing system herein), which represents an embodiment of cloud-based host system 200 of FIG. 2. Cloud-based server system 464 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 464 to smart devices (e.g., when available, when purchased, or at routine intervals).

In some implementations, the network interface 460 includes a conventional network device (e.g., a router), and the smart home environment 400 of FIG. 4 includes a hub device 480 that is communicatively coupled to the network(s) 462 directly or via the network interface 460. The hub device 480 is further communicatively coupled to one or more of the above intelligent, multi-sensing, network-connected devices (e.g., smart devices of the smart home environment 400). Each of these smart devices optionally communicates with the hub device 480 using one or more radio communication networks available at least in the smart home environment 400 (e.g., ZigBee, Z-Wave, Insteon, Bluetooth, Wi-Fi and other radio communication networks). In some implementations, the hub device 480 and devices coupled with/to the hub device can be controlled and/or interacted with via an application running on a smart phone, household controller, laptop, tablet computer, game console or similar electronic device. In some implementations, a user of such controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols—and is configured to streamline adding of new devices and commissioning of the hub device. In some implementations, hub device 480 further includes a local storage device for storing data related to, or output by, smart devices of smart home environment 400. In some implementations, the data includes one or more of: video data output by a camera device, metadata output by a smart device, settings information for a smart device, usage logs for a smart device, and the like.

In some implementations, smart home environment 400 includes a local storage device 490 for storing data related to, or output by, smart devices of smart home environment 400. In some implementations, the data includes one or more of: video data output by a camera device (e.g., cameras 418 or doorbell camera 406), metadata output by a smart device, settings information for a smart device, usage logs for a smart device, and the like. In some implementations, local storage device 490 is communicatively coupled to one or more smart devices via a smart home network (e.g., smart home network 202, FIG. 2). In some implementations, local storage device 490 is selectively coupled to one or more smart devices via a wired and/or wireless communication network. In some implementations, local storage device 490 is used to store video data when external network conditions are poor. For example, local storage device 490 is used when an encoding bitrate of cameras 418 exceeds the available bandwidth of the external network (e.g., network(s) 462). In some implementations, local storage device 490 temporarily stores video data from one or more cameras (e.g., cameras 418) prior to transferring the video data to a server system (e.g., cloud-based server system 464).

Further included and illustrated in the exemplary smart-home environment 400 of FIG. 4 are service robots 468, each configured to carry out, in an autonomous manner, any of a variety of household tasks. For some embodiments, the service robots 468 can be respectively configured to perform floor sweeping, floor washing, etc. in a manner similar to that of known commercially available devices such as the Roomba™ and Scooba™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 468 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks. Further, such service robots may have one or more cameras and/or microphones that enable service robots 468 to stream video and/or audio to cloud-based host system 464 (and thus perform the functions of a streaming video camera similar to one of cameras 418).

When serving as a localized air monitor/purifier for an occupant, a particular service robot 468 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 468 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 468, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 468 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 468 can be advised by other smart-home sensors that the temperature and humidity levels are rising in the kitchen, which is nearby the occupant's current dining room location, and responsive to this advisory, the hazard detector service robot 468 will temporarily raise a hazard detection threshold, such as a smoke detection threshold, under an inference that any small increases in ambient smoke levels will most likely be due to cooking activity and not due to a genuinely hazardous condition.

Figure 5:
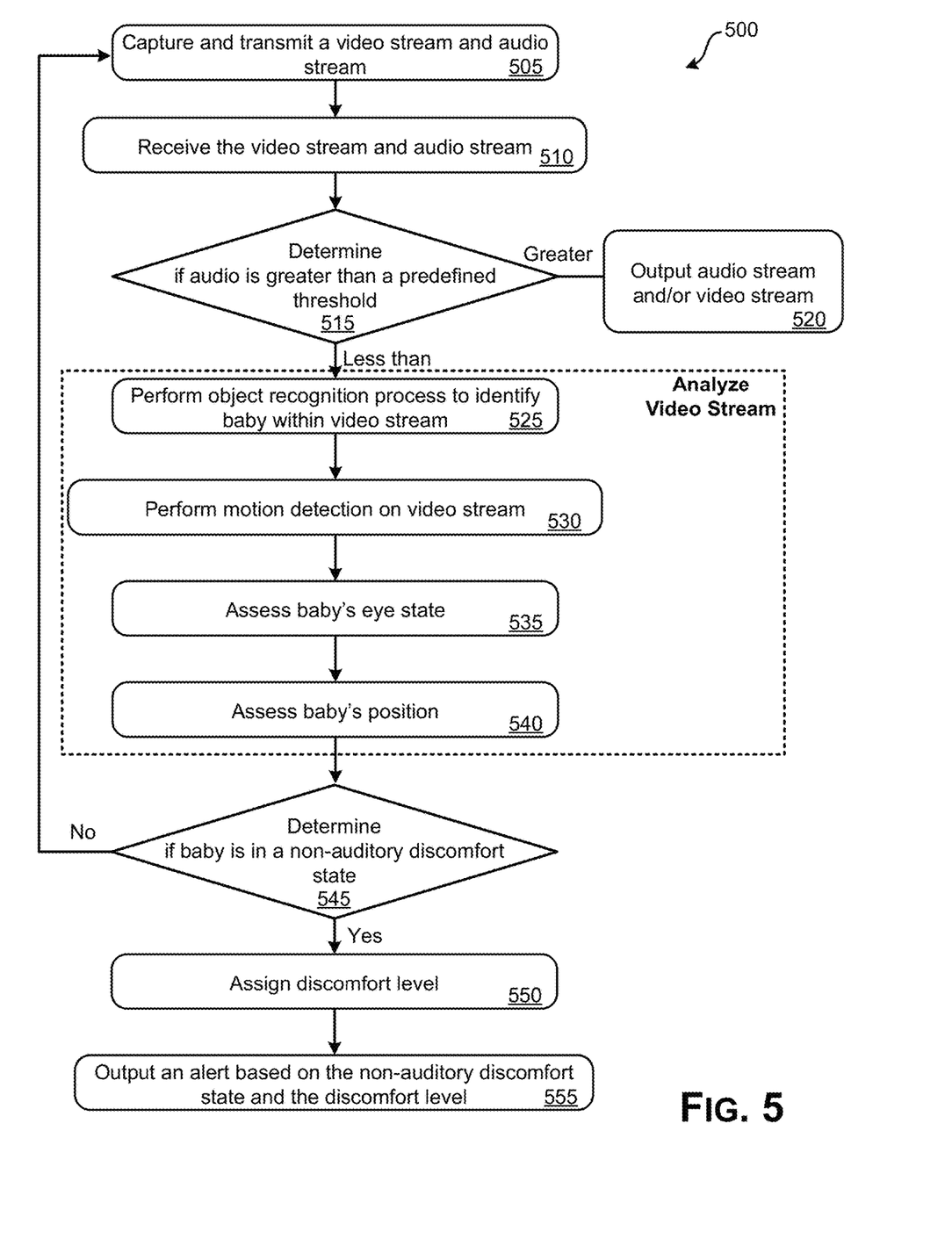
FIG. 5 illustrates an embodiment of a method for issuing an alert based on baby behavior.

Various methods may be performed using the systems and devices detailed in relation to FIGS. 1-4. FIG. 5 illustrates an embodiment of a method 500 for issuing an alert based on baby behavior. Such an alert may be referred to as a non-auditory discomfort alert since it is indicative of a baby being in discomfort but not making any significant amount of noise. Method 500 may be performed by baby monitoring system 140, which may be integrated in streaming video camera 110, baby monitor receiver 120, end-user device 170, or as a cloud-based service executed using one or more remote server system.

At block 505, a video stream and audio stream may be captured by a streaming video camera or other form of device that has an integrated camera and microphone. In some embodiments, separate devices are used to capture video and audio. The video and audio may be streamed to a system or device that functions as baby monitoring system 140. If baby monitoring system 140 is incorporated as part of the streaming video camera, the video and audio streams may be analyzed locally and may not necessarily be transmitted. At block 510, the video stream and audio stream may be received by the baby monitoring system, which may be executed using one or more cloud-based servers.

At block 515, the audio stream may be analyzed to determine if the average audio volume remains below a predefined threshold for at least a predefined period of time. This volume threshold may be set by a user or may be defined by the service provider. In some embodiments, excursions above the threshold within the period of time may be permitted without triggering a transition to block 520 if the excursion above the threshold is shorter than a predefined excursion time duration. This excursion time period may be brief, such as less than one or two seconds. For instance, a cough or sneeze by the baby may be short enough in duration that block 515 can still proceed to block 525. If the received audio exceeds the average threshold and/or an excursion about the threshold is for longer than the predefined excursion time duration, a non-auditory discomfort alert may not be appropriate and method 500 may proceed to block 520. At block 520, the video and/or audio stream may be output to an end-user device, smart home device, and/or baby monitor receiver. For instance, the received audio may be transmitted to and output by an end-user device such that a parent can hear the sound being made by the baby. Other forms of alerts, such as a push notification, alarm, beep, synthesized or recorded speech announcement, or chime may be output by the end-user device in addition or in alternate to the video and/or audio stream.

If the predefined sound threshold is not exceeded at block 515, method 500 may proceed to block 525. Blocks 525 through 540 may be a set of processes used to analyze the received video stream. At block 525, an object recognition process may be performed to identify a baby, if present, within the video stream. The object recognition process may be a neural network process that may have been trained using a training set of images of babies in order to identify a baby in a variety of positions and orientations relative to the streaming video camera. The object recognition process may be trained to function in low light or based on infrared light, such that the streaming video camera can be used to monitor the baby in a low visible light environment (e.g., a dark room at night). At block 525, portions of the video stream corresponding to the baby may be isolated from the background remainder of the video stream.

At block 530, on the portion of the video stream isolated at block 525 which has been identified as the baby, motion detection may be performed to determine if the baby is moving, and, possibly, how much the baby is moving. Various movement thresholds that are linked with time may be established. A threshold may define a time and a distance, such as whether the baby has moved less than an inch within ten seconds. This amount of movement may be classified as a "low" level of movement. A second threshold in combination with the first threshold may define a "medium" level of movement, such as moving more than one inch but less than six inches, within ten seconds. A third threshold in combination with the second threshold may define a "high" level of movement, such as moving more than six inches within ten seconds. Movement measurements may be restricted to the baby's torso and/or head, may focus on the baby's limbs, or may focus on an amount of movement of the baby's center of mass.

At block 535, the baby's eye state may be determined. When the baby is generally facing in the direction of the streaming video camera, it may be possible to determine if the baby's eyes are fully open, partially open, or shut. If the baby is facing away from the streaming video camera, block 535 may be skipped and may not be used to assess the baby's discomfort level. Similar to block 525, a training process using a set of training images may be used to train a neural network to identify various states of the baby's eyes.

At block 540, the baby's position may be assessed. The baby's position may be determined to be: laying on back, laying on stomach, laying on side, crawling, sitting, standing unsupported, standing supported, climbing, etc. A training process using a set of training images may be used to train a neural network to identify various baby positions.

At block 545, a determination may be made as to whether the baby is in a non-auditory discomfort state. Block 545 may involve using the analyzed data of blocks 525 through 540. Block 545 may involve computing a metric based on the outcome of blocks 525-540. That is, various amounts of motion, various baby eye states, and various baby positions may each be assigned a score value which can be used to compute a metric value. If the metric value is above a defined threshold (or below the threshold, depending on how the point values are assigned), the baby may be determined to be in a discomfort state. The greater (or lower) the point value, the greater the discomfort level or severity. In other embodiments, a table, database, or other data storage arrangement may be maintained that relates specific combinations of motion, eye state, and position to a determination of whether or not the baby is in non-auditory discomfort and, possibly, a severity or level. Such an arrangement may be similar to table 1. Therefore, a lookup within the table may be performed at block 545. At block 545, if the baby is not determined to be in a discomfort state (that is, the baby is determined to be in a comfort state), method 500 may return to block 505 to continue monitoring the baby.

In some embodiments, a baby being determined to be in a state where he is likely to wake up imminently (e.g., within the next five minutes, within the next ten minutes, within the next two minutes) may be determined similarly to be in a non-auditory discomfort state according to method 500. The video stream being indicative of the baby starting to move (e.g., after having been still for an extended period of time, indicative of sleep), eyes being shut, the baby in a lying position may be indicative of the baby being about to wake up. In this situation, an alert (auditory or otherwise) output at block 555 may be indicative of the baby being likely to wake up soon, rather than the baby being in discomfort.

If the baby is determined at block 545 to be in an non-auditory discomfort state, method 500 may proceed to block 550. At block 550, a level or severity may be assigned to the determined discomfort level. The level or severity may be assigned similarly to the determination of the discomfort state at block 545, such as by using the metric or by performing a lookup in a database or table. The level or severity may affect: whether or not an alert is output and/or how the alert is output. An end-user may be able to define a preference as to what level of non-auditory discomfort is necessary for an alert to be output. The type of alert (e.g., auditory, visual) may be based on the level or severity. For example, a push notification or text may be sent to an end-user device for a low severity non-auditory discomfort alert. An auditory alert, possibly output by multiple smart home devices, may be output for a medium or high severity alert.

Non-auditory discomfort alerts may be output in visual and/or auditory form. Auditory form may be particularly useful if the parent or other caretaker is not monitoring an end-user device or baby monitor receiver. Such auditory form for non-auditory discomfort alerts may take the form of a chime, chirp, beep (or other ringtone-like sound available at the end-user device) a recorded baby cry (such as of the baby being monitored or some other baby), a synthesized baby cry, or a recorded or synthesized spoken language message (e.g., "Your baby isn't crying, but seems to be in discomfort."). Such a spoken message may be particularly useful to inform a parent: where the baby is located, that the baby is in non-auditory discomfort, how severe of a discomfort state the baby is in, and, possibly, specifics of the baby's condition, such as the baby's position, eye state, and how much the baby is moving. The volume of the alert output may be based on the severity or level of the discomfort state: the greater the discomfort, the greater the volume. Such an arrangement may be user-configurable. If a recorded or synthesized baby cry is being used as the auditory representation of the non-auditory discomfort level, adjustment of the cry's volume may be particularly effective for informing a parent of the baby's discomfort level.

At block 555, the alert may be output by an end-user device, baby monitor receiver, and/or one or more smart home devices, such as those detailed in relation to FIG. 4. In some embodiments, the end-user device, baby monitor receiver, and/or smart home device receives information related to the non-auditory discomfort state and the discomfort level. The receiving device then determines whether and how the non-auditory discomfort alert should be output. The output alert may be at least partially based on the determined discomfort level or severity. The sound to use for the alert may be transmitted to the end-user device from the baby monitoring system or the data necessary to create the sound may be stored locally by the output device to be used to output the sound. One or more visual alerts may accompany an auditory representation of the non-auditory alert. For example, if the end-user device is a smart phone, a visual message may provide details about the non-auditory discomfort state, such as: a timestamp, the baby's eye state, the baby's determined position, the baby's amount of movement, a video clip of the baby that corresponds to when the baby was determined to be in the discomfort state, a live video and/or audio feed of the baby, an option to launch a live view of the baby, etc.

Figure 6:
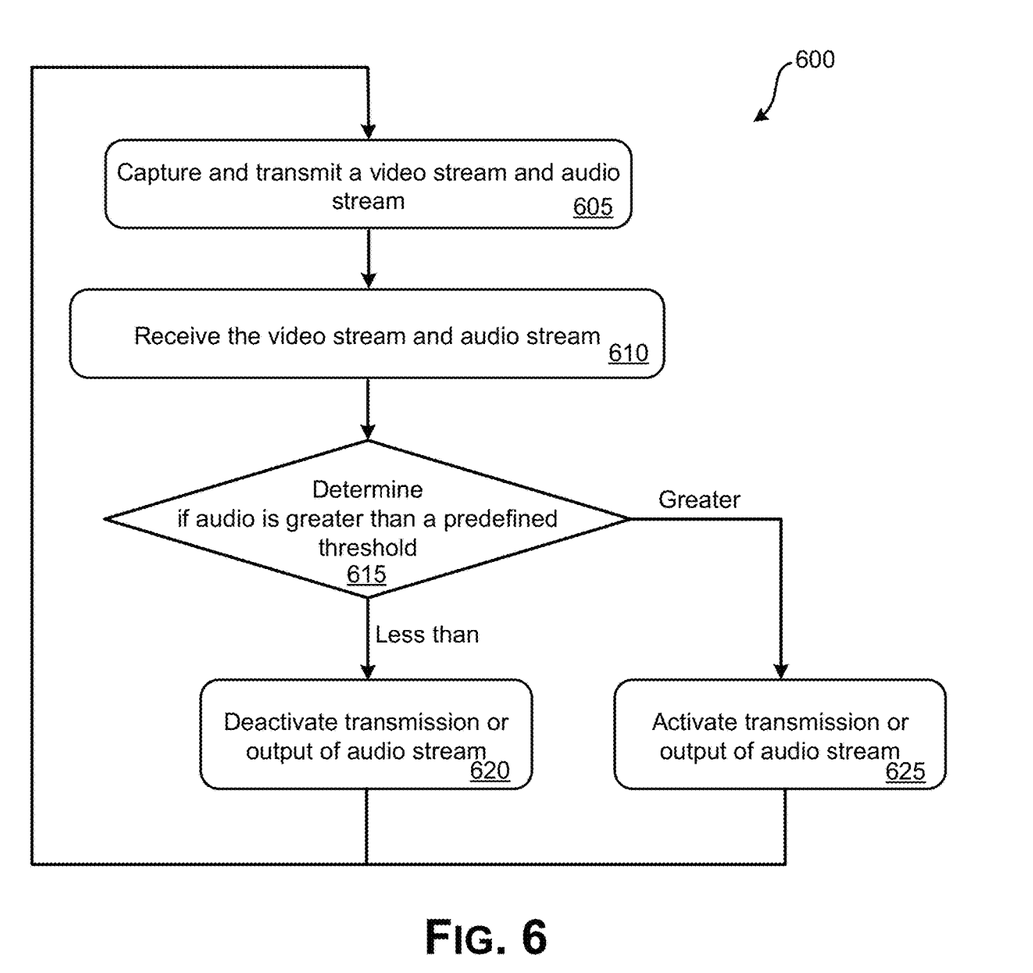
FIG. 6 illustrates an embodiment of a method for activating and deactivating an audio stream based on baby behavior.

FIG. 6 illustrates an embodiment of a method for activating and deactivating transmission and/or output an audio stream based on baby behavior. Method 600 may be performed by baby monitoring system 140, which may be integrated in streaming video camera 110, baby monitor receiver 120, end-user device 170, or as a cloud-based service executed using one or more remote server systems. In other embodiments, method 600 may be performed by the end-user device, baby monitor receiver, or smart home device that is used to output video and/or audio. Method 600 may be performed in concert with method 500. That is, as part of the analysis of whether a non-auditory alert is to be output, method 600 may be evaluated to determine if the audio stream (and/or video stream) should be transmitted and/or output by an end-user device, baby monitor receiver, and/or smart home device.

At block 605, a video stream and audio stream may be captured by a streaming video camera or other form of device that has an integrated camera and microphone. In some embodiments, separate devices are used to capture video and audio. The video and audio may be transmitted to a system or device that functions as baby monitoring system 140. If baby monitoring system 140 is incorporated as part of the streaming video camera, the video and audio streams may be analyzed locally and may not necessarily be transmitted. At block 610, the video stream and audio stream may be received by the baby monitoring system, which may be executed using one or more cloud-based servers.

At block 615, it may be determined if an average measured audio volume exceeds a predefined threshold for at least a defined period of time. The threshold may be user- or provider-defined, as may be the defined period of time. The threshold determination of block 615 may use the same or a different threshold than block 515 of method 500. If the average audio volume exceeds the defined volume threshold for at least the defined period of time, method 600 may proceed to block 625, through which the audio (and/or video) stream is transmitted and/or output by an end-user device, smart home device, and/or baby monitor receiver. If the average audio volume does not exceed the defined volume threshold for at least the defined period of time, method 600 may proceed to block 620. At block 620, transmission or output of the audio (and/or video) stream is deactivated. For block 620 to be performed, the baby may be required to be classified as in a comfort state in accordance with method 500. Method 600 may be repeated continuously to determine whether transmission and/or output of the audio (and/or video) stream should be activated or deactivated.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for issuing alerts based on baby behavior, the method comprising:
   receiving, by a cloud-based baby monitoring system, via the Internet, a video stream and an audio stream, wherein:
   the video stream and the audio stream is linked with a user account; and
   a baby is present within frames of the video stream;
   determining, by the cloud-based baby monitoring system, that less than a threshold amount of sound is present within the audio stream;
   in response to determining that less than the threshold amount of sound is present within the audio stream, analyzing, by the cloud-based baby monitoring system, the video stream to determine the baby is in a non-auditory discomfort state, wherein analyzing the video steam comprises:
      performing motion detection of the baby within the frames of the video stream to determine an amount of motion of the baby; and
      determining that the baby is in the non-auditory discomfort state based on the amount of motion of the baby exceeding a movement threshold;
   determining, by the cloud-based baby monitoring system, to output a notification to a caregiver based on the determined non-auditory discomfort state; and
   transmitting, by the cloud-based baby monitoring system, an alert indicative of the non-auditory discomfort state to an end-user device that is linked with the user account.

2. The method for issuing alerts based on the baby behavior of claim 1, further comprising:
   receiving, by the end-user device, the alert indicative of the non-auditory discomfort state;
   analyzing, by the end-user device, the alert indicative of the non-auditory discomfort state to determine that an auditory alert is to be output based on the received alert; and
   outputting, by the end-user device, the auditory alert via a speaker.

3. The method for issuing alerts based on the baby behavior of claim 2, wherein the auditory alert output via the speaker is a recorded or synthesized baby cry.

4. The method for issuing alerts based on the baby behavior of claim 3, further comprising:
   determining, by the cloud-based baby monitoring system, a discomfort level based on analyzing the video stream; and
   determining a volume setting based on the determined discomfort level, wherein the auditory alert is output by the end-user device via the speaker based at least in part on the determined volume setting.

5. The method for issuing alerts based on the baby behavior of claim 1, wherein analyzing the video stream and the audio stream to determine the baby is in the non-auditory discomfort state further comprises:
   determining that the eyes of the baby are open, wherein determining that the baby is in the non-auditory discomfort state is at least partially based on determining that the eyes of the baby are open.

6. The method for issuing alerts based on the baby behavior of claim 1, further comprising:
   capturing, using a streaming video camera, the video stream and the audio stream; and
   transmitting, by the streaming video camera, to a cloud-based video analysis platform, the video stream and the audio stream, wherein the cloud-based baby monitoring system is incorporated as part of the cloud-based video analysis platform.

7. The method for issuing alerts based on the baby behavior of claim 1, wherein the non-auditory discomfort state represents a pre-wakeup state indicative of the baby being expected to wake up imminently.

8. The method for issuing alerts based on the baby behavior of claim 1, further comprising:

deactivating a streaming audio channel to the end-user device based on less than the threshold amount of sound being present within the audio stream and the baby being in a comfort state.

9. A system for issuing an alert based on a baby's behavior, comprising:
a cloud-based host system, comprising:
a storage arrangement that receives and stores video and audio streams from a plurality of streaming video cameras; and
a baby monitoring system, comprising:
one or more processors; and
a memory communicatively coupled with and readable by the one or more processors and having stored therein processor-readable instructions which, when executed by the one or more processors, cause the one or more processors to:
receive a video stream and an audio stream, wherein:
a baby is present within frames of the video stream; and
the video stream and the audio stream is linked with a user account;
determine that less than a threshold amount of sound is present within the audio stream;
in response to determining that less than the threshold amount of sound is present within the audio stream, analyze the video stream and the audio stream to determine the baby is in a non-auditory discomfort state, wherein analyzing the video stream comprises:
performing motion detection of the baby within the frames of the video stream to determine an amount of motion of the baby; and
determining that the baby is in the non-auditory discomfort state based on the amount of motion of the baby exceeding a movement threshold;
determine to output a notification to a caregiver based on the determined non-auditory discomfort state; and
transmit an alert indicative of the non-auditory discomfort state to an end-user device that is linked with the user account.

10. The baby monitoring system of claim 9, further comprising an application executed by the end-user device, the application being configured to:
receive the alert indicative of the non-auditory discomfort state;
analyze the alert indicative of the non-auditory discomfort state to determine that an auditory alert is to be output based on the received alert; and
output the auditory alert via a speaker.

11. The baby monitoring system of claim 10, wherein the auditory alert output via the speaker is a recorded or synthesized baby cry.

12. The baby monitoring system of claim 11, wherein the cloud-based host system is further configured such that the processor-readable instructions, when executed, further cause the one or more processors to:
determine a discomfort level based on analyzing the video stream; and
determine a volume setting based on the determined discomfort level, wherein the auditory alert is output by the end-user device via the speaker based at least in part on the determined volume setting.

13. The baby monitoring system of claim 9, wherein the processor-readable instructions that, when executed, cause the one or more processors to analyze the video and audio stream to determine the baby is in the non-auditory discomfort state comprise processor-readable instructions which, when executed, cause the one or more processors to:
determine that the eyes of the baby are open, wherein determining that the baby is in the non-auditory discomfort state is at least partially based on determining that the eyes of the baby are open.

14. The baby monitoring system of claim 9, further comprising a streaming video camera of the plurality of streaming video cameras, wherein the streaming video camera is configured to:
capture the video stream and the audio stream; and
transmit to the cloud-based host system, the video stream and the audio stream.

15. The baby monitoring system of claim 9, wherein the non-auditory discomfort state represents a pre-wakeup state indicative of the baby being expected to wake up imminently.

16. The baby monitoring system of claim 9, wherein the cloud-based host system is further configured such that the processor-readable instructions, when executed, further cause the one or more processors to:
deactivate a streaming audio channel to the end-user device based on less than the threshold amount of sound being present within the audio stream and the baby being in a comfort state.

17. A baby monitoring system for issuing an alert based on a baby's behavior, the baby monitoring system comprising:
a cloud-based host system, comprising:
a storage arrangement that receives and stores video and audio streams from a plurality of streaming video cameras; and
a streaming video camera comprising an integrated baby monitoring system, comprising:
one or more processors; and
a memory communicatively coupled with and readable by the one or more processors and having stored therein processor-readable instructions which, when executed by the one or more processors, cause the one or more processors to:
receive a video stream and an audio stream, wherein:
the video stream and the audio stream is linked with a user account; and
a baby is present within frames of the video stream;
determine that less than a threshold amount of sound is present within the audio stream;
in response to determining that less than the threshold amount of sound is present within the audio stream, analyze the video stream and the audio stream to determine the baby is in a non-auditory discomfort state, wherein analyzing the video steam comprises:
performing motion detection of the baby within the frames of the video stream to determine an amount of motion of the baby; and
determining that the baby is in the non-auditory discomfort state based on the amount of motion of the baby exceeding a movement threshold;
determine to output a notification to a caregiver based on the determined non-auditory discomfort state; and transmit an alert indicative of the non-auditory discomfort state to an end-user device that is linked with the user account.

* * * * *